United States Patent
Francois et al.

(10) Patent No.: US 9,848,204 B2
(45) Date of Patent: Dec. 19, 2017

(54) SPATIAL PREDICTION METHOD AND DEVICE, CODING AND DECODING METHODS AND DEVICES

(71) Applicant: THOMSON LICENSING, Issy de Moulineaux (FR)

(72) Inventors: Edouard Francois, Bourg des Comptes (FR); Dominique Thoreau, Cesson Sevigne (FR); Jerome Vieron, Paris (FR); Fabien Racape, Berlin (DE)

(73) Assignee: THOMSON LICENSING, Les Moulineaux (FR)

(*) Notice: Subject to any disclaimer, the term of this patent is extended or adjusted under 35 U.S.C. 154(b) by 285 days.

(21) Appl. No.: 14/412,683

(22) PCT Filed: Jun. 27, 2013

(86) PCT No.: PCT/EP2013/063546
§ 371 (c)(1),
(2) Date: Jan. 4, 2015

(87) PCT Pub. No.: WO2014/005930
PCT Pub. Date: Jan. 9, 2014

(65) Prior Publication Data
US 2015/0195567 A1    Jul. 9, 2015

(30) Foreign Application Priority Data
Jul. 4, 2012 (FR) .................... 12 56406

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
CPC .. H04N 19/593; H04N 19/105; H04N 19/176; H04N 19/11; H04N 19/192; H04N 19/14; H04N 19/463
See application file for complete search history.

(56) References Cited

U.S. PATENT DOCUMENTS 8,199,818 B2    6/2012  Yoshino et al.
8,787,456 B2    7/2014  Murakami et al.
(Continued)

FOREIGN PATENT DOCUMENTS

CN    101467461    6/2009
EP    2388999      11/2011
(Continued)

OTHER PUBLICATIONS

Sarwer etal: "A novel bit rate reduction method of H.264/AVC intra coding", Image and Signal Processing (CISP), 2010 3rd International Congress on, IEEE, Oct. 16, 2010, pp. 24-25.
(Continued)

*Primary Examiner* — Nam Pham
(74) *Attorney, Agent, or Firm* — Brian J. Dorini; Patricia A. Verlangieri (57) ABSTRACT

A spatial prediction method of a block of pixels of an image, called current block, using a plurality of spatial prediction modes based on neighboring pixels of the current block is disclosed. The method comprises determining a prediction block of the current block according to each one of said spatial prediction modes and selecting one of said prediction blocks according to a predetermined criterion. According to the invention, before carrying out the preceding steps, it is detected, among said spatial prediction modes, whether some of them are redundant. If such redundant modes are detected, one of them is replaced by an additional mode, distinct from the other spatial prediction modes.

36 Claims, 8 Drawing Sheets

(51) Int. Cl.
*H04N 19/176* (2014.01)
*H04N 19/11* (2014.01)
*H04N 19/14* (2014.01)
*H04N 19/192* (2014.01)
*H04N 19/463* (2014.01)

(52) U.S. Cl.
CPC ............ *H04N 19/14* (2014.11); *H04N 19/176* (2014.11); *H04N 19/192* (2014.11); *H04N 19/463* (2014.11)

(56) References Cited

U.S. PATENT DOCUMENTS

| 9,008,173 | B2 | 4/2015 | Matsuo et al. | |
|---|---|---|---|---|
| 2007/0237228 | A1 | 10/2007 | Han et al. | |
| 2008/0175319 | A1 | 7/2008 | Sun et al. | |
| 2011/0280304 | A1* | 11/2011 | Jeon | H04N 19/105 375/240.12 |
| 2012/0008675 | A1 | 1/2012 | Karczewicz et al. | |
| 2012/0287998 | A1 | 11/2012 | Sato | |
| 2013/0114727 | A1* | 5/2013 | Sato | H04N 19/00696 375/240.16 |

FOREIGN PATENT DOCUMENTS

| JP | 2008245088 | 10/2007 |
|---|---|---|
| JP | 2008271371 | 11/2008 |
| JP | 2009105696 | 5/2009 |
| JP | 2010233263 | 10/2010 |
| KR | 2007077955 | 7/2007 |
| KR | 2010037564 | 4/2010 |
| KR | 2010059038 | 6/2010 |
| WO | WO20050107267 | 11/2005 |
| WO | WO2009051091 | 4/2009 |
| WO | WO2011049605 | 4/2011 |
| WO | WO2011089972 | 7/2011 |
| WO | WO2014005924 A1 | 1/2014 |

OTHER PUBLICATIONS

Zhu etal: "Adaptive intra modes reduction by clustering for H.264/AVC" Image Processing (ICIP), 2011 18th IEEE International Conference on, IEEE, Sep. 11, 2011, pp. 1665-1668.

ITUT: H264: "Advanced Video Coding for generic audiovisual services"; Mar. 2010; pp. 1-676.

JCTVC-A124: "Samsung's response to the call for proposals on video compression technology", JCT-VC 1st meeting, Apr. 15-23, 2010; pp. 1-40.

Shah etal: "Area optimized H264 intra prediction architecture for 1080p HD resolution", Proceedings of the 21st IEEE International Conference on Application-Specific Systems, Architectures and Processors (ASAP 2010), Jul. 7-9, 2010l pp. 297-300.

Yuan etal: "Fast and Efficient Intraprediction Method for H 264 AVC", SPIE—The international society for optical engineering, Apr. 2010; vol. 49; pp. 1-3.

Search Dated October 18, 2013.

Sugimoto et al., "Reduced number of intra chroma prediction mode", Document JCTVC-G449, Joint Collaborative Team on Video Coding (JCT-VC) of ITU-T SG 16 WP3 and ISO/IEC JTC1/SC29/WG11, 7th Meeting, Geneva, Switzerland, Nov. 21, 2011, pp. 1-9.

"High efficiency video coding," International Telecommunication Union.Series H: Audiovisual and Multimedia Systems Infrastructure of audiovisual services—Coding of moving video. Apr. 2013. pp. 1-317.

* cited by examiner

SPATIAL PREDICTION METHOD AND DEVICE, CODING AND DECODING METHODS AND DEVICES

This application claims the benefit, under 35 U.S.C. §365 of International Application PCT/EP2013/063546, filed Jun. 27, 2013, which was published in accordance with PCT Article 21(2) on Jan. 9, 2014 in English and which claims the benefit of French patent application No. 1256406, filed Jul. 4, 2012.

TECHNICAL FIELD

The invention is situated in the domain of coding and decoding with intra prediction. The invention relates more particularly to a spatial prediction method of a block of pixels of an image, coding method and a decoding method using spatial prediction and a corresponding spatial prediction device.

PRIOR ART

In the digital world, it is known to apply compression techniques to reduce the quantity of data to store or to transmit. One of these techniques is predictive coding. An image, called prediction, that is meant to be as close as possible to the source, is generated, according to diverse methods, then is subtracted from the original image, to thus form a residual image. It is these residual data that are encoded then transmitted and/or stored. Much less voluminous, these data are enough to recreate the image after diverse known decoding operations.

Among the techniques that can generate this prediction image, there is spatial prediction, also called intra prediction or intra coding. In this case, the coder generates the prediction images by basing itself on a known neighbourhood within this image. The compression performances are thus directly linked to the quality of this prediction. The more efficient the prediction algorithms, the less residual data there will be and the better the compression rates will be.

Figure 1:
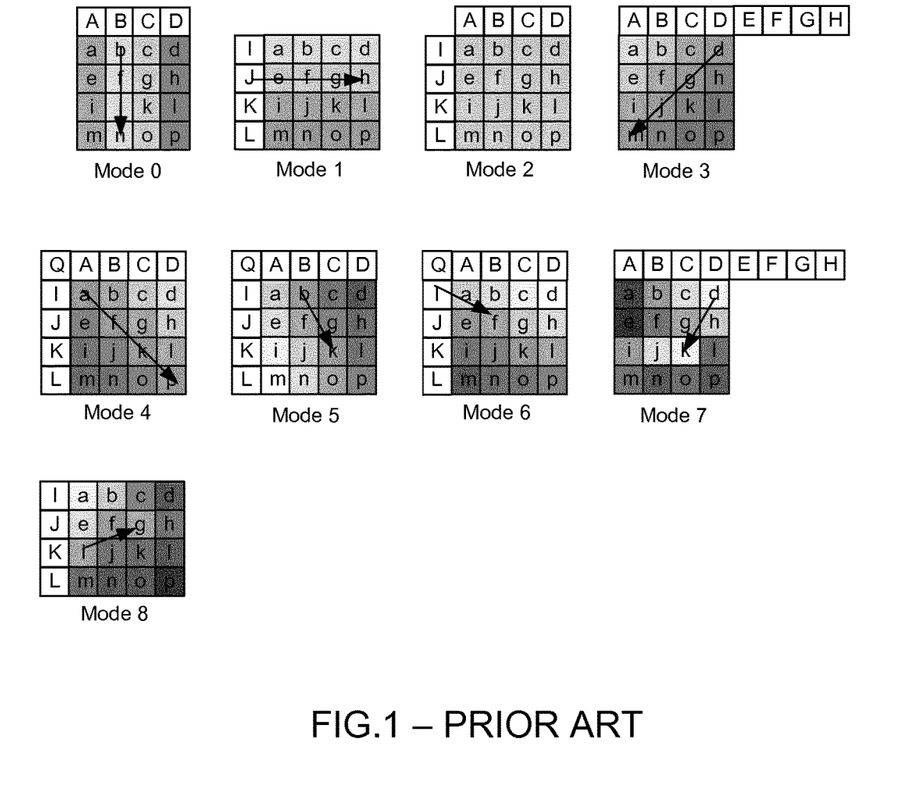
FIG. 1, already described, diagrammatically shows the 9 spatial prediction modes defined for the blocks of pixels 4×4 in the standard AVC/H264.

Within the framework of the standard H.264/AVC, spatial prediction is carried out in the pixel domain and consists in predicting all the pixels of a block by using a combination of the surrounding pixels already coded in the same image slice and several prediction modes are used to predict the pixels of a current block of pixels. For example, for the luminance, 8 directional prediction modes and an averaged mode (DC) are defined for the coding of blocks of dimensions 4×4 or 8×8. FIG. 1 illustrates the prediction modes used for the blocks of dimension 4×4. The prediction modes shown in this figure are as follows:

mode 0 or vertical mode: the value of the pixels A, B, C, D arranged above the block to predict is propagated vertically to the pixels of the block to predict, mode 1 or horizontal mode: the value of the pixels I, J, K, L arranged to the left of the block to predict is propagated horizontally to the pixels of the block to predict, mode 2 or DC mode: the average value of the pixels A, B, C, D, I, J, K, L arranged to the left of the block to predict is propagated horizontally to all the pixels of the block to predict, mode 3 or diagonal down-left mode: the value of the pixels A,B,C,D,E,F,G,H arranged above the block to predict or a combination of these values is propagated to the pixels of the block to predict according to the diagonal pointing to the down-left corner of the block to predict, mode 4 or diagonal down-right mode: the value of the pixels A, B, C, D, I, J, K, L, Q arranged to the left and above the block to predict or a combination of these values is propagated to the pixels of the block to predict according to the diagonal pointing to the down-right corner of the block to predict, in the other five modes 5 (vertical right), 6 (horizontal down), 7 (vertical left) and 8 (horizontal up), the value of the pixels arranged above or to the left of the block to predict or a combination of these values is propagated to the pixels of the block to predict according to a direction whose angle is greater or less than 45° in relation to the vertical.

Each of these prediction modes is indexed, the index corresponding to the number of the mode, and this index is coded in the bitstream in the same way as the data of the blocks.

An analysis of this prediction process has shown that it regularly occurs, notably at low bitrate, that two or more intra prediction modes generate very similar, even identical, predictions. The fact of having several possible prediction modes of which some are redundant generate a loss in coding efficiency as they unnecessarily limit the possible choice of prediction modes.

SUMMARY OF THE INVENTION

The present invention aims to improve the efficiency of the intra prediction and thus to reduce the coding cost of the residual data by enlarging the range of prediction modes available when there are, among the prediction modes used, redundant modes.

More particularly, the purpose of the invention is a spatial prediction method of a block of pixels of an image, called current block, using a plurality of spatial prediction modes based on neighbouring pixels of the current block, comprising the following steps:

a) determination of a prediction block of the current block according to each of the spatial prediction modes, and b) selection of one of the prediction blocks according to a predetermined criterion.

According to the invention, the prediction method further comprises, prior to steps a) and b), the steps:

c) detection of redundant spatial prediction modes generating noticeably similar prediction blocks, and d) for each pair of redundant spatial prediction modes, generation of a spatial prediction mode, called additional mode, distinct from other spatial prediction modes and replacement of one of the redundant spatial prediction modes by the additional mode.

Hence, according to the invention, the unnecessary spatial prediction modes are removed and they are replaced by additional modes corresponding to a new prediction possibility. The range of possible spatial predictions is thus enriched to improve the efficiency of the prediction.

According to a particular embodiment, the detection of redundant spatial prediction modes comprises the following steps:

determination of a prediction block for each spatial prediction mode, comparison, two by two, of the prediction blocks determined in such a manner as to determine, for each pair of prediction blocks, a representative difference of the difference between both prediction blocks of the pair, and if, for a pair of prediction blocks; the difference is less than a first predetermined threshold ($\lambda$), then the two spatial prediction modes corresponding to the two prediction blocks of the pair are considered as redundant.

Naturally, this first threshold is transmitted in the bitstream of the coded image so that the decoder can use it.

As a variant, the detection of the redundant spatial prediction modes is carried out only from values, in luminance and/or in chrominance, of the neighbouring pixels on which the spatial prediction modes are based.

In this embodiment, the detection of redundant spatial prediction modes comprises the following steps:
- calculation of the average value, called first average value, of the luminance or chrominance values of the neighbouring pixels on which a first spatial prediction mode is based,
- calculation of the average value, called second average value, of the luminance or chrominance values of the neighbouring pixels on which a second spatial prediction mode is based,
- calculation of the absolute value of the difference between the first average value and the second average value,
- if the absolute value of the difference is less than a second predetermined threshold ($T_2$), then the first and second spatial prediction modes are redundant spatial prediction modes.

Advantageously, prior to the calculation step of the first or second average value, the detection step of redundant spatial prediction modes comprises
- a calculation step of the maximum difference of the luminance or chrominance values of the neighbouring pixels on which the first or second spatial prediction mode is based,
- if the maximum difference is greater than or equal to a third predetermined threshold ($T_1$), then the first or second spatial prediction modes are redundant spatial prediction modes.

These second and third thresholds ($T_2, T_1$) area also transmitted in the bitstream of the coded image so that the decoder can use it.

The additional mode being substituted for a given spatial prediction mode can be unique and defined once for all in a conversion table or be adaptive.

In this second case, the additional mode replacing a given spatial prediction mode is created by carrying out the following steps:
- enlarge by 1 pixel, in a direction opposite the prediction direction of the spatial prediction mode to replace, the zone of the neighbouring pixels on which the spatial prediction mode to replace is based, the prediction direction of a spatial prediction mode designating the direction according to which the luminance or chrominance values of the neighbouring pixels on which the spatial prediction mode to replace is base are propagated in the prediction block, in such a manner as to obtain a new set of neighbouring pixels on which the additional mode is based,
- check if the additional mode and spatial prediction mode are not redundant,
- if the additional mode and spatial prediction mode are redundant, start the enlargement step again until the additional mode and prediction mode are not redundant.

Preferably, the enlargement step is only reiterated at most a predetermined number of times.

In this embodiment, the calculation of the value of a pixel p of the prediction block according to an additional mode is carried out by the following steps:
- among the pixels of the set of neighbouring pixels of the additional mode, identification of the neighbouring pixels present along a vector pointing to the pixel p and parallel to the direction of prediction of the additional mode, and
- calculation of the value of the pixel p of the prediction block from the value of the neighbouring pixels identified.

The value of the pixel p is calculated by an interpolation function of the values of the neighbouring pixels identified. This interpolation function is for instance:
- the median of the luminance values of the neighbouring pixels identified, or
- the average of the luminance values of the neighbouring pixels identified.

The invention also relates to a method for coding a block of pixels of an image, called current block, comprising the following steps for:
- determining a prediction block of the current block,
- determining a residual block from the current block and the prediction block,
- transforming and quantizing the residual block according to a quantization step, and
- entropy coding of the quantized residual block.

According to the invention, the prediction block of the current block is determined according to the prediction method defined above.

According to the invention, the first predetermined threshold, an index of the spatial prediction mode used or the second and third predetermined thresholds are coded in the data stream containing the current block.

According to a particular embodiment, the second and third predetermined thresholds are dependent on the quantization step.

The invention also relates to a method for decoding a coded residual block corresponding to a block of pixels, called current block, of an image, comprising the following steps:
- entropy decoding of the residual block,
- inverse quantization and inverse transformation of the decoded residual block,
- determining a prediction block of the current block, and
- determining a current block from the decoded residual block and the prediction block, According to the invention, the prediction block of the current block is determined according to the prediction method defined above.

Finally, the invention relates to a spatial prediction device of a block of pixels of an image, called current blocks, from a plurality of spatial prediction modes based on neighbouring pixels of the current block, comprising a module for determining a prediction block of the current block according to each one of the spatial prediction modes and selecting one of the prediction blocks according to a predetermined criterion, According to the invention, the spatial prediction device comprises, upstream of the determination module,
- a module for detecting redundant spatial prediction modes generating noticeably similar prediction blocks, and
- a module able to generate, for each pair of redundant spatial prediction modes, a spatial prediction mode, called additional mode, distinct from other spatial prediction modes and replacement of one of the redundant spatial prediction modes by the additional mode.

BRIEF DESCRIPTION OF THE FIGURES

Other advantages can still appear to those skilled in the art upon reading the examples below, illustrated by the annexed figures, provided for illustrative purposes.

DETAILED DESCRIPTION OF EMBODIMENTS

According to the invention, it is proposed to define, in addition to all the standard spatial prediction modes, hereinafter referred to as basic prediction modes, a second set of prediction modes, hereinafter referred to as additional modes, intended to be substituted for a basic prediction mode when the latter is redundant with another basic prediction mode. The basic prediction modes are for examples the prediction modes of FIG. 1 within the framework of the standard AVC/H264.

In the rest of the description, the context of the AVC/H264 coding will be used for illustrative purposes. However, the invention can be generalised to other coding schemas, as for example the schema proposed in the document JCTVC-A124 published in April 2010 during the meeting of the JCT-VC group (acronym for Joint Collaborative Team on Video Coding) at Dresden.

Figure 2:
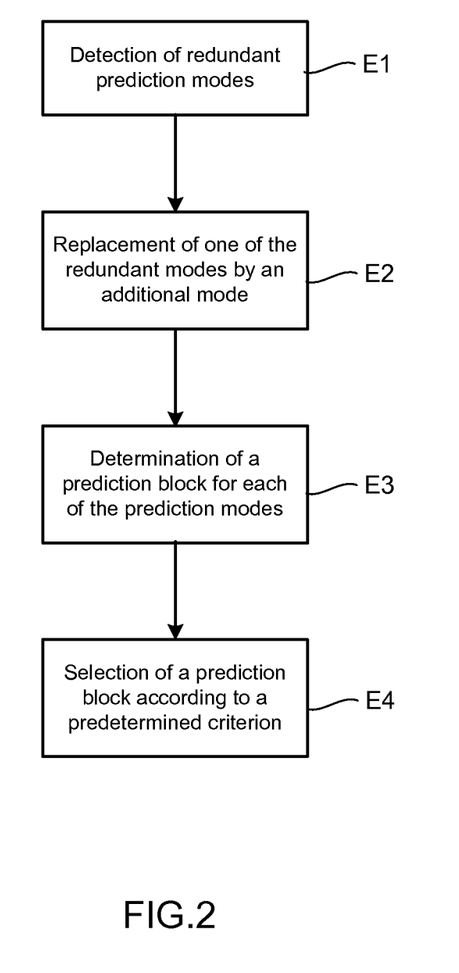
FIG. 2 shows a flow chart of the spatial prediction method in accordance with the invention.

FIG. 2 diagrammatically shows the steps of the spatial prediction method in accordance with the invention, In reference to this figure, the method comprises
- a step, E1, consisting in detecting, from among the basic prediction modes, the redundant prediction modes, that is generating noticeably similar prediction blocks for the current block,
- for each pair of redundant basic prediction modes detected, a step E2 for generating an additional mode that is separate from all the basic prediction modes and replacing one of these redundant modes by said additional mode in such a manner as to obtain a new set of prediction modes for the current block,
- a step E3 for determining a prediction block of the current block according to each of the prediction modes of the new set, and
- a step E4 for selecting, according to a predetermined criterion, one of the prediction blocks calculated in the previous step.

This selection criterion of the prediction block of the current block is for example a distortion-bit-rate criterion or a distortion criterion, this type of criterion being known by those skilled in the art.

The detection of redundant prediction modes consists in identifying the spatial prediction modes terminating in similar prediction blocks. The prediction modes are compared two-by-two, and the modes that are detected as mutually similar are considered as redundant. In a pair of redundant modes, only one of these modes is conserved, the other being replaced by an additional mode.

If an additional mode proves to be redundant with the mode that it must replace, a new additional mode is tested as long as there are other possible additional modes, or as long as a predetermined number of tested additional modes has not been reached.

A first solution for detecting the redundant prediction modes consists in comparing between each other the prediction blocks that are obtained by each of the basic prediction modes. It is noted $p_i(x,y)$ the value of the pixel of coordinates (x,y) of the prediction block generated according to the prediction mode of index i and it is noted B the block of pixels to predict (current block).

Two prediction modes of index i and j are considered as redundant if the prediction blocks generated according to the two modes are similar pixel to pixel. According to a particular embodiment, the maximum difference $e_{max}$ between these two prediction blocks is evaluated and this difference is compared to a predetermined threshold $\lambda$.

The following is therefore calculated $$e_{max} = \max_{(x,y) \in B} |p_i(x, y) - p_j(x, y)|$$

The following test is then carried out:
if $e_{max} < \lambda$, then the modes of index i and j are redundant,
otherwise, the modes of index i and j are not redundant,
Threshold $\lambda$ can be transmitted in the bitstream, for example in the header of the slice or of the coded image. This threshold can also be a function of the quantization parameter that is transmitted per slice, image or macroblock in the case of the standard AVC/H.264. According to an embodiment variant, $e_{max}$ is replaced by $$e_{avg} = 1/N * \sum_{(x,y) \in B} |p_i(x, y) - p_j(x, y)|$$

where N is the number of pixels in the block B. This first solution is based on a comparison of the prediction blocks obtained by the prediction modes.

Figure 3:
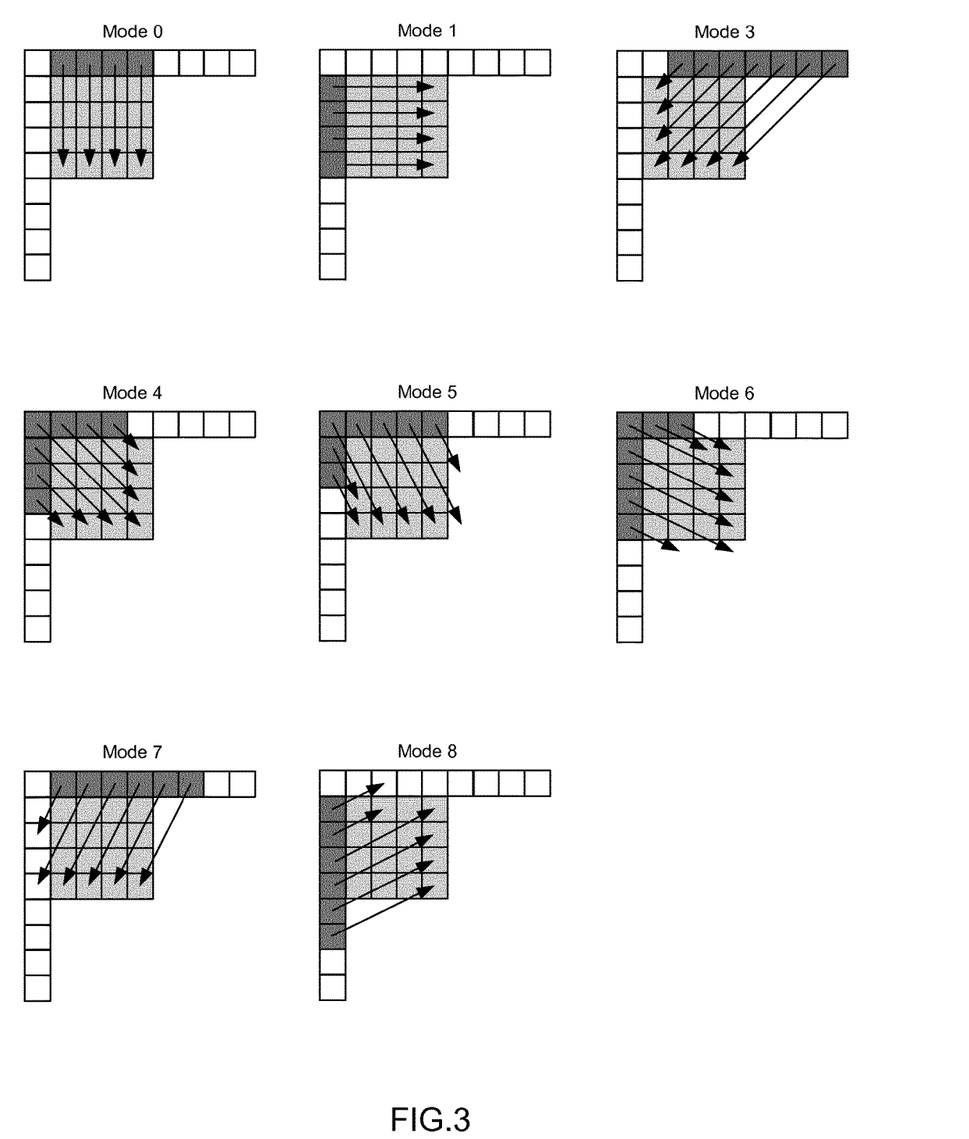
FIG. 3 is a diagram identifying the neighbouring pixels of a current block of pixels on which are based the coding modes of FIG. 1 are based.

Another solution less costly in calculations consists in comparing, for two prediction modes to test, the neighbouring pixels (or bounding pixels) already reconstructed (or already coded) that they use. For example, in the case of the standard AVC/H.264, FIG. 3 shows the neighbouring pixels (in dark grey) used to define the prediction block for each of the prediction modes defined for the blocks of size 4×4. In this figure, the current block to predict appears in light grey.

In this other solution, the detection of redundant modes is carried out only from values, in luminance and/or in chrominance, of the neighbouring pixels (in dark grey) on which the spatial prediction modes are based. According to this solution, two modes are considered as redundant if the neighbouring pixels used by these two modes are similar in luminance and possibly chrominance.

Figure 4:
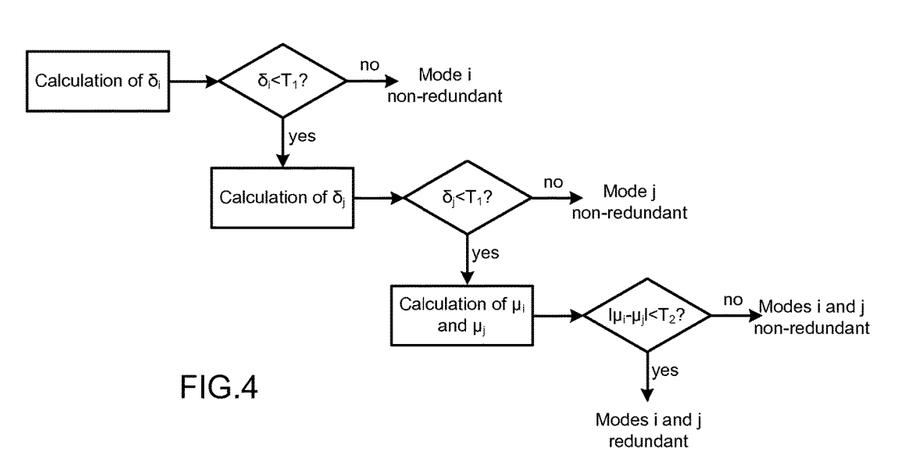
FIG. 4 is a flow chart showing the steps used to determine redundant coding modes according to a particular embodiment, FIG. 5 diagrammatically shown possible additional modes intended to replace the coding modes of FIG. 1.

In the rest, it is noted $Y(x,y)$ the luminance of the pixel of coordinates (x,y). It is reasoned here with the luminance signal but, naturally, the following algorithm can be extended by including the chrominance signal. It is noted $S_i$ the set of the neighbouring pixels used by the prediction mode of index i and $S_j$ the set of the neighbouring pixels used by the prediction mode of index j. The following algorithm illustrated by FIG. 4 is proposed for detecting if the modes i and j are redundant:

the maximum difference $\delta_i$ of the luminance values of the neighbouring pixels of the mode i is calculated:

$$\delta_i = \max_{(x,y) \in S_i} (Y(x, y)) - \min_{(x,y) \in S_i} (Y(x, y))$$

if the maximum difference $\delta_i$ is greater than a predetermined threshold $T_1$, then the mode i is distanced from the redundant spatial prediction modes and there is a transition to another mode to compare, the maximum difference $\delta_j$ of the luminance values of the neighbouring pixels of the mode j is then calculated:

$$\delta_j = \max_{(x,y) \in S_j} (Y(x, y)) - \min_{(x,y) \in S_j} (Y(x, y))$$

if the maximum difference $\delta j$ is greater than the threshold $T_1$, then mode j is removed from the redundant spatial prediction modes, the average value $\mu_i$ of the luminance values of the neighbouring pixels of the mode i then the average value $\mu_j$ of the luminance values of the neighbouring pixels of the mode j, finally, the value $|\mu_i - \mu_j|$ calculated; if the value $|\mu_i - \mu_j|$ greater than or equal to a predetermined threshold $T_2$, then modes i and j are considered as non-redundant; otherwise, the modes i and j are considered as redundant.

The thresholds $T_1$ and $T_2$ have 2 and 1 for example for values and are transmitted in the bitstream of the coded image, for example in the header of the coded image, so that the decoder can use it.

In a more developed variant, the thresholds $T_1$ and $T_2$ can be a function of the quantization step, noted QP, and are for example equal to:

$$T_1 = (\sqrt{QP})/2 \text{ and } T_2 = (\sqrt{QP})/2$$

In this variant, determination rule or rules of $T_1$ and $T_2$ is (are) naturally the same in the coder and decoder. Hence, in this case, the threshold values $T_1$ and $T_2$ are therefore not sent as the quantization step QP is always sent in any case.

The additional mode being substituted for a basic prediction mode can be unique and defined once for all for example in a conversion table. In this table, an additional mode is associated with each basic prediction mode, this additional mode being intended to replace said basic prediction mode in the case where this one is declared redundant.

Advantageously, the additional mode intended to replace a basic prediction mode is not set and changes according to the content of the neighbouring pixels of the basic prediction mode considered. Indeed, the additional mode that is defined to replace the basic prediction mode must not be redundant with the latter.

According to an advantageous embodiment, the additional mode MC being substituted for a basic prediction mode MB is generated by carrying out the following steps:

one enlarges by a depth of 1 pixel and in a direction opposite to the prediction direction of the mode MB, the zone of the neighbouring pixels on which the mode MB is based, such as to obtain a set of neighbouring pixels on which the mode MC is based; for example in the case of the mode 0 of the standard AVC/H.264, the zone of pixels comprises not only the placed pixels A, B, C and D of the block to predict but also the pixels A', B', C' and D' placed above pixels A, B, C and D, concerning the mode 1, the zone of pixels comprises not only the placed pixels I, J, K and L of the block to predict but also the I', J', K' and L' placed to the left of pixels I, J, K and L . . . , a check is then made whether or not the additional mode thus defined with an enlarged neighbouring pixel zone and the basic prediction mode are redundant, if they are redundant, the enlargement step is repeated until they are no longer redundant or that a maximum enlargement is reached; the enlargement step is only reiterated at most a predetermined number of times giving the maximum enlargement.

Figure 5:
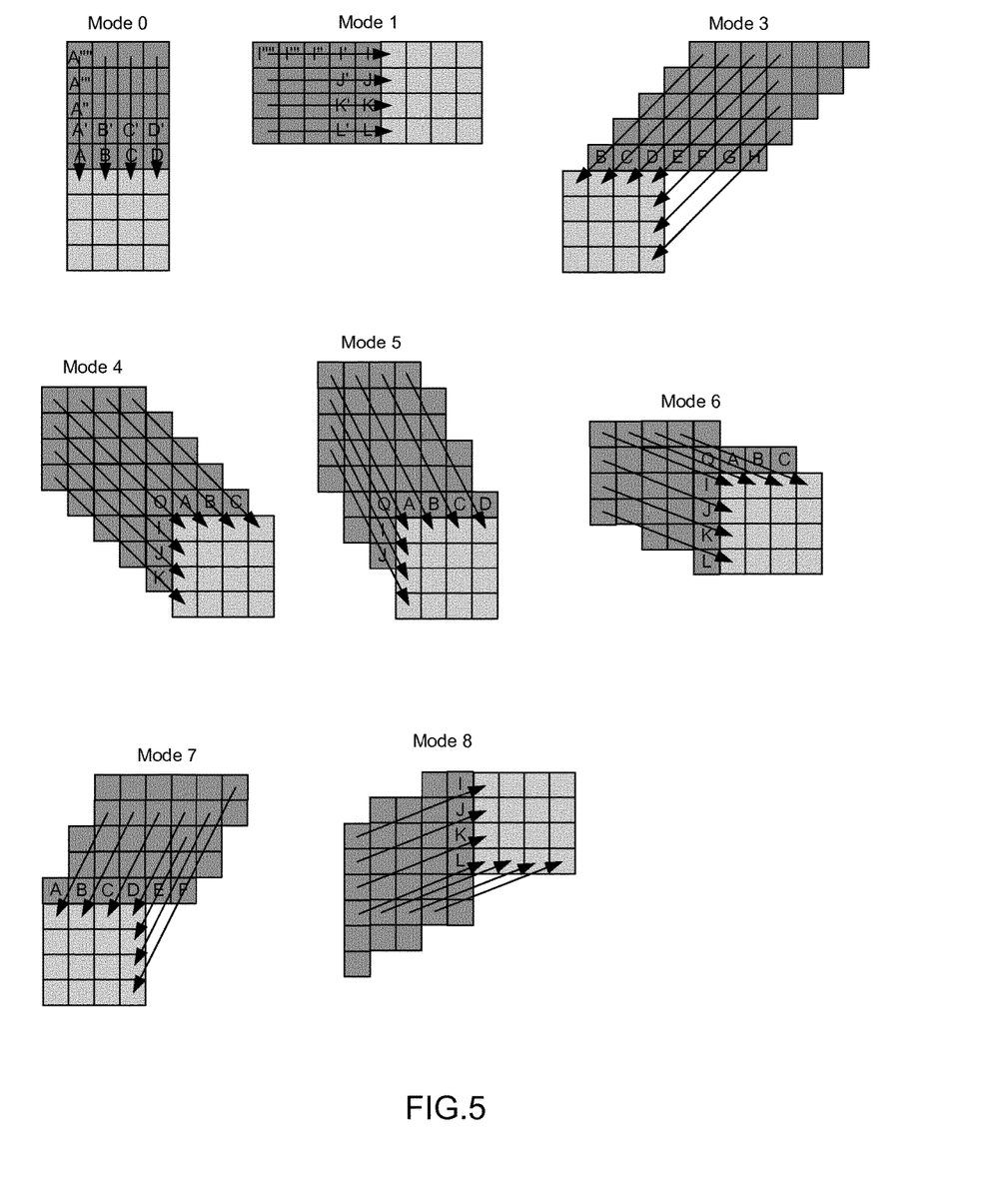

FIG. 5 shows the enlargement mechanism of the zones of neighbouring pixels for the generation of additional modes for the modes 1 and 3 to 9 of the standard AVC/H264 for the blocks of size 4×4. In this figure, the mechanism is limited to 5 pixels in the opposite direction to the prediction direction. No replacement mode is proposed for the mode 2 (DC) as this is by definition a non-directional mode. It is a widely used mode. It is therefore not planned to replace it.

The use of these new prediction modes modifies the calculation of the prediction block. For this calculation, a zone of neighbouring pixels having a given depth N is considered.

The calculation of the value of a pixel p(0,0) of the prediction block according to an additional mode is thus implemented as follows:

among the pixels of the set of neighbouring pixels used by the additional mode, the neighbouring pixels present along a vector pointing to the pixel p(0,0) and parallel to the prediction direction of the additional mode are identified; for example, in the case of mode 0 of FIG. 5, this involves pixels A, A', A'', A''' and A'''' and in the case of mode 1, this involves pixels I, I', I'', I''' and I''''.

the value of the pixel p of the prediction block is then calculated from the value of the neighbouring pixels identified.

The value of the pixel p(0,0) is calculated by an interpolation function of the values of the neighbouring pixels identified. The following is calculated for example:

the median of the luminance values of the neighbouring pixels identified, or the average of the luminance values of the neighbouring pixels identified, or a linear function of the type f(x,y)=a+b.x+c.y with a, b and c calculated by the least squares method from the luminance value of neighbouring pixels identified along vectors; for example, if, along a vector of given direction, the change in terms of luminance levels (or chrominance) of this luminance (or chrominance) is of type y=ax+b, whereas the value of the pixel p(0,0) will take for value the one that, in position (0,0), is from the modelling y=ax+b.

These operations (identification of neighbouring pixels placed along the vector pointing to the pixel p(x,y) are reiterated then the luminance value of the pixel p(x,y) is calculated for the calculation of the luminance value of the other pixels p(x,y) of the prediction block when an additional mode such as illustrated in FIG. 5 is used.

Figure 6:
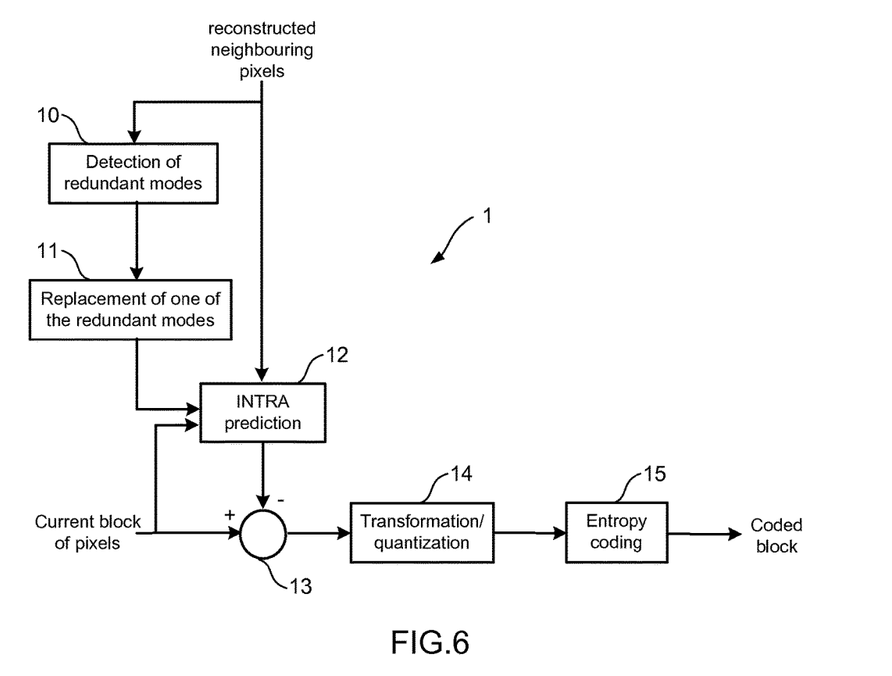
FIG. 6 is a schema of a coder implementing the method of the invention.

This spatial prediction process is for example implemented in a coder as illustrated by FIG. 6. This coder, referenced 1, comprises a module 10 for detecting redundant prediction modes, a module 11 able to generate an additional mode as previously defined and to replace one of the redundant modes of each pair of redundant modes by said additional mode, a module 12 for determining a prediction block for each of the spatial prediction modes available and selecting one of the prediction blocks according to a bit-rate-distortion optimisation criterion, a differential module 13 for generating a residual block from the prediction block and the current block, a module 14 for transforming and/or quantizing to generate a quantized residual block and an entropy coding module 15 to generate the coded current block to insert into the data stream to transmit.

For the entropy coding, the coder generally generates statistics on the prediction mode used to define the number of bits with which the residual block will be coded. The coder must thus be able to generate statistics for the basic modes and additional modes. The entropy coder codes in the bitstream of the image an index of the mode used, the maximum number of indexes generally corresponding to the number of base modes. The same index i is used to designate a basic mode or the additional mode that replaces it.

Figure 7:
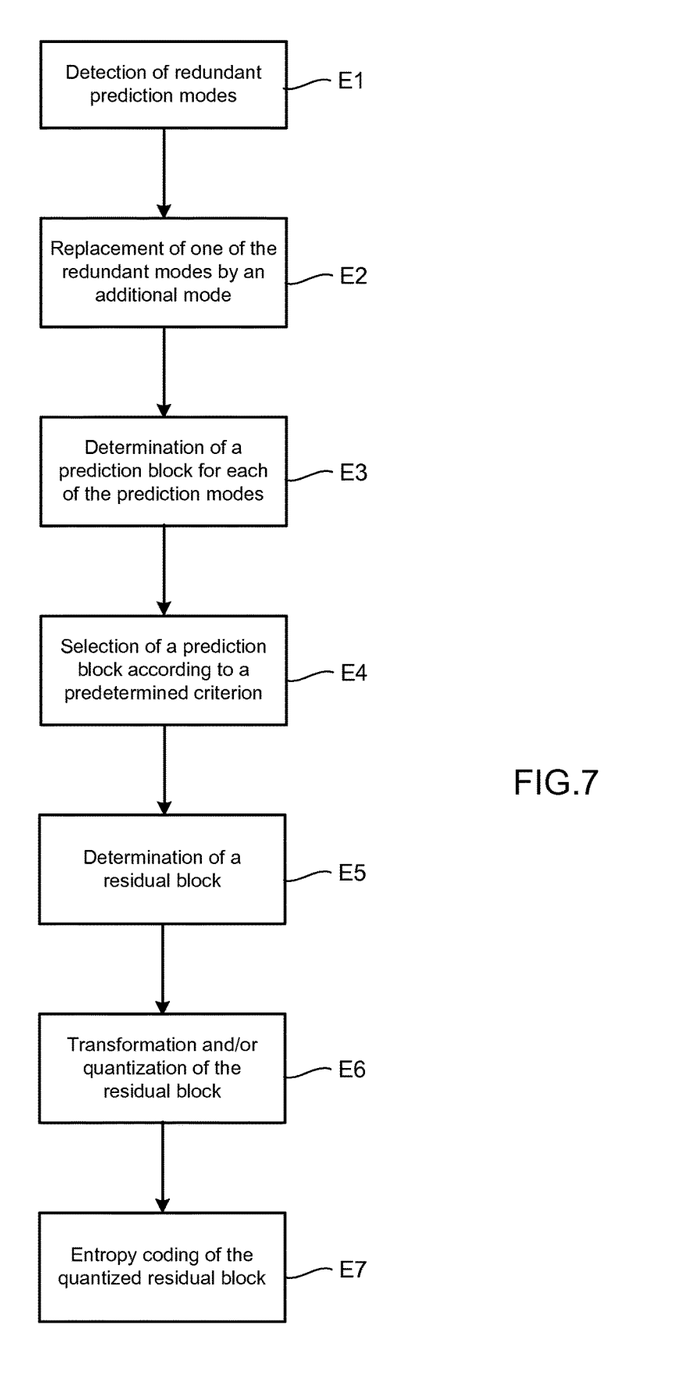
FIG. 7 is a flow chart showing the steps of a coding method using the spatial prediction method of FIG. 2.

The steps implemented by the coder of FIG. 6 are recapitulated in FIG. 7:
the steps E1 to E4 of FIG. 2 are reproduced to generate the prediction block for the current block,
a residual block is determined, in step E5, from the current block and the prediction block,
the residual block produced is quantized then transformed in a step E5, and
finally, the quantized residual block is coded by an entropy coder in a step E7.

Figure 9:
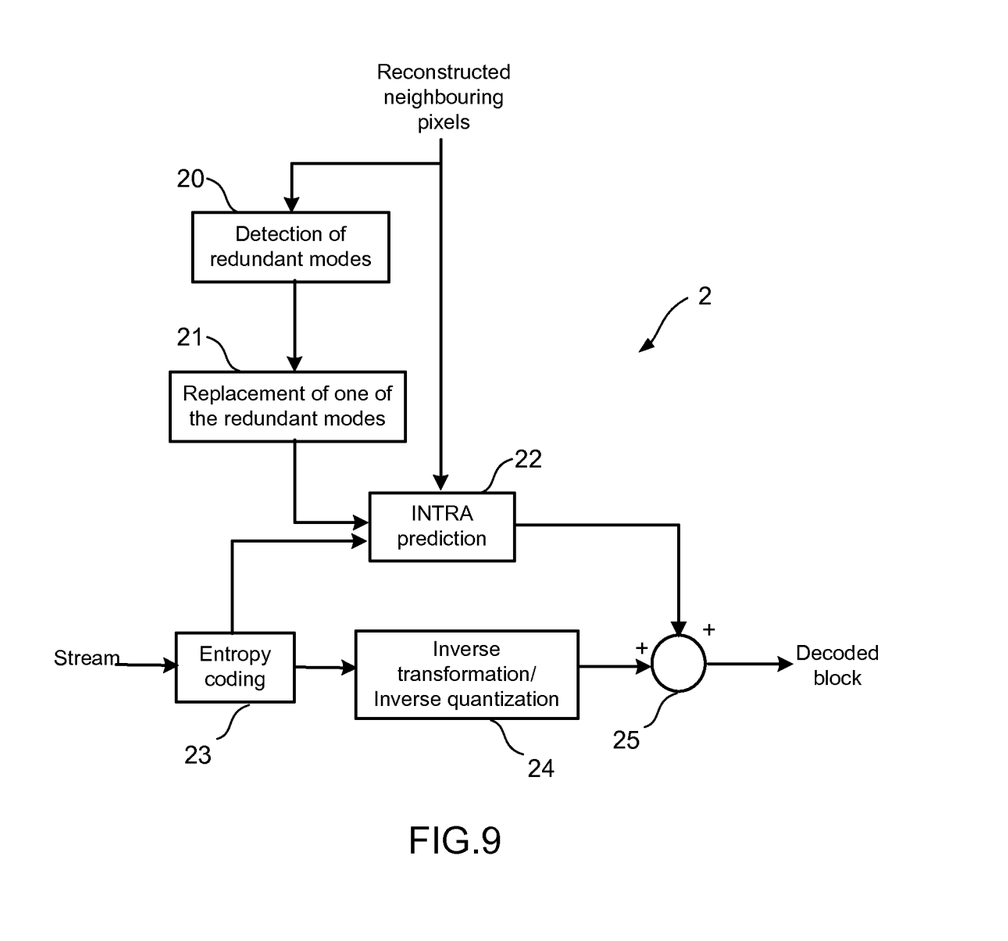
FIG. 9 is a schema of a decoder implementing the method of the invention.

This spatial prediction process is for example implemented in a decoder as illustrated by FIG. 9. This decoder, referenced 2, comprises a module 20 for detecting redundant prediction modes, a module 21 able to generate an additional mode as defined previously and to replace one of the redundant modes of each pair of redundant modes by said additional mode, a prediction module 22 able to determine a prediction block from a prediction mode index for the current block, an entropy coding module 23 able to generate a residual block corresponding to the current block to decode and the prediction mode index for the current block, a module 24 for inverse transformation and/or inverse quantization of the decoded residual block and a module 25 to add the pixel block from the prediction module 22 and the module 24 for generating the decoded current block.

For reception, the decoder, when it receives the bitstream, notably receives the index i of the prediction mode used. As it carries out the same redundant mode detection operations and, if necessary, the same replacement operations of the basic modes as the coder, it will be able to know if the index designates the basic mode or an additional mode.

Figure 8:
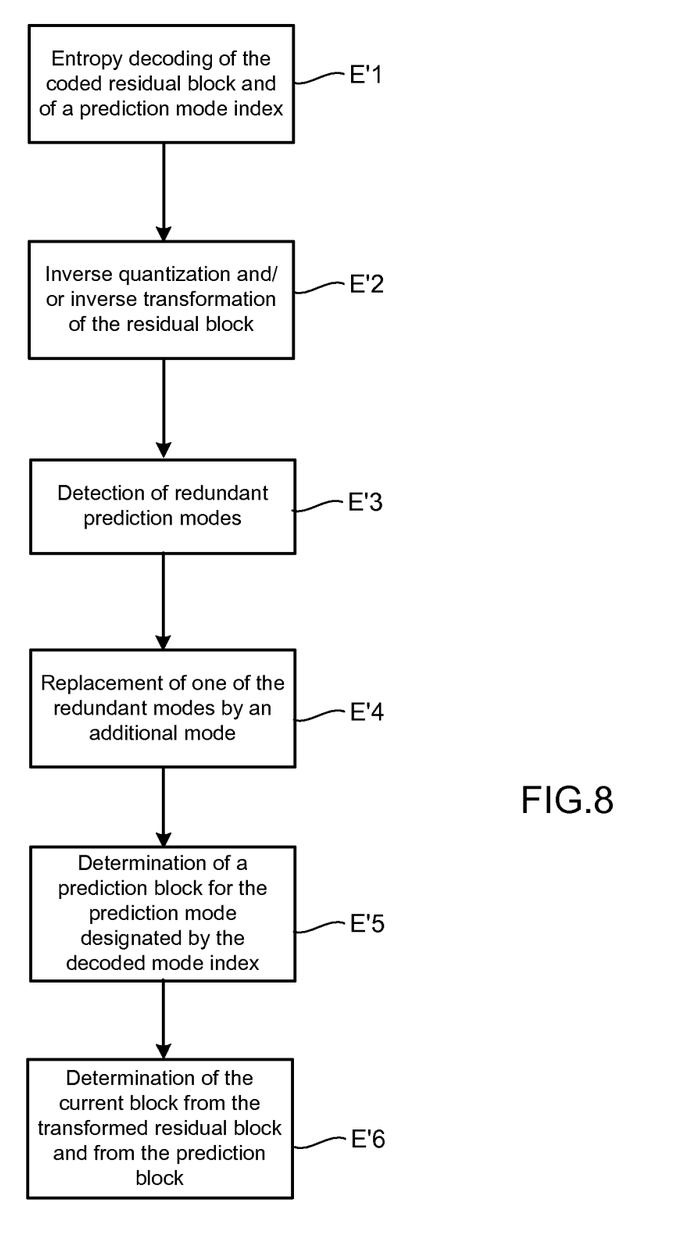
FIG. 8 is a flow chart showing the steps of a decoding method using the spatial prediction method of FIG. 2.

The decoder also receives, in addition to the coded residual block, the threshold λ or the thresholds $T_1$ and $T_2$. It then carries out the steps of FIG. 8:
step E'1: entropy decoding of said residual block corresponding to the current block and of an index designating a prediction mode for the current block,
step E'2: inverse quantization and/or inverse transformation (DCT Discrete Cosine Transform) of the decoded residual block,
steps E'3 to E'4 corresponding to steps E1 to E2 of FIG. 2: detection of redundant modes and replacement of the redundant modes by additional modes),
step E'5: determination of a prediction block from the decoded mode index in step E1, and
step E'6: determination of the current block from the transformed residual block and the prediction block, The coder 1 and decoder 2 according to the invention are for example implemented on a computer platform having hardware components such as one or more microprocessors or CPUs, a random access memory or RAM, a non-volatile ROM type memory, and one or more input/output interface (s) which are linked by an address and data bus. The platform can also include a human-machine interface. The platform generally comprises an operating system and microcode. According to one implementation embodiment, the algorithms implementing the steps for the methods specific to the invention are stored in the ROM memory. When powered up, the microprocessor loads and runs the instructions of these algorithms.

According to variants, coders and decoders compatible with the invention are implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components integrated into a device or even in a form of a mix of hardware elements and software elements.

Although the invention has been described in relation to different particular embodiments, it is obvious that it is in no way restricted and that it comprises all the technical equivalents of the means described together with their combinations if the latter fall within the scope of the invention.

In this description, a bit-rate-distortion optimisation criterion is used to select the prediction block to use for a current block. Naturally, other criteria can be used, for example bitrate optimisation criteria or distortion optimisation criteria.

The invention claimed is:
1. Method for coding a current block of pixels of an image, comprising:
determining a prediction block of the current block,
determining a residual block from said current block and said prediction block,
transforming and quantizing the residual block according to a quantization step size to obtain a quantized residual block, and
entropy encoding the quantized residual block, wherein the prediction block of the current block is determined by:
detecting, in a plurality of spatial prediction modes, redundant spatial prediction modes generating similar prediction blocks,
generating, for each pair of redundant spatial prediction modes, an additional spatial prediction mode distinct from the spatial prediction modes of said plurality of spatial prediction modes and replacing, in said plurality of spatial prediction modes, one of the redundant spatial prediction modes by the additional spatial prediction mode,
determining the prediction block of the current block according a spatial prediction mode of the plurality of spatial prediction modes.
2. Method according to claim 1, wherein detecting, in a plurality of spatial prediction modes, redundant spatial prediction modes comprises:
determination of a prediction block for each spatial prediction mode,
comparison, two by two, of the prediction blocks determined in such a manner as to determine, for each pair of prediction blocks, a value representative of the difference between both prediction blocks of the pair, and if, for a pair of prediction blocks, the value is less than a first threshold, then the two spatial prediction modes corresponding to the two prediction blocks of the pair are considered as redundant.

3. Method according to claim 1, wherein detecting, in a plurality of spatial prediction modes, redundant spatial prediction modes is carried out from values, in luminance and/or in chrominance, of neighboring pixels on which said spatial prediction modes are based.

4. Method according to claim 3, wherein detecting, in a plurality of spatial prediction modes, redundant spatial prediction modes comprises:
  calculation of the average value, called first average value, of the luminance or chrominance values of the neighboring pixels on which a first spatial prediction mode is based,
  calculation of the average value, called second average value, of the luminance or chrominance values of the neighboring pixels on which a second spatial prediction mode is based,
  calculation of the absolute value of the difference between the first average value and the second average value,
  if the absolute value of the difference is less than a second threshold, then said first and second spatial prediction modes are redundant spatial prediction modes.

5. Method according to claim 4, wherein, prior to the calculation of the first or second average value, detecting redundant spatial prediction modes comprises
  calculation of the maximum difference of the luminance or chrominance values of the neighboring pixels on which the first or second spatial prediction mode is based,
  if said maximum difference is greater than or equal to a third threshold, then said first or second spatial prediction mode is removed from the spatial prediction modes.

6. Method according to claim 1, wherein the additional spatial prediction mode replacing a given spatial prediction mode is obtained by:
  enlarging by 1 pixel, in a direction opposite the prediction direction of the spatial prediction mode to replace, the zone of the neighboring pixels on which said spatial prediction mode to replace is based, in such a manner as to obtain a set of neighboring pixels on which the additional spatial prediction mode is based,
  checking if said additional spatial prediction mode and said spatial prediction mode are not redundant,
  if said additional spatial prediction mode and said spatial prediction mode are redundant, starting the enlargement again until said additional spatial prediction mode and said prediction mode are not redundant.

7. Method according to claim 6, wherein the enlargement is only reiterated at most a predetermined number of times.

8. Method according to claim 6, wherein calculation of the value of a pixel p of the prediction block according to an additional spatial prediction mode comprises:
  among the pixels of the set of neighboring pixels of the additional spatial prediction mode, identifying of the neighboring pixels present along a vector pointing to the pixel p and parallel to the direction of prediction of the additional spatial prediction mode, and
  calculating the value of the pixel p of the prediction block from the value of the neighboring pixels identified.

9. Method according to claim 8, wherein the value of the pixel p is calculated by an interpolation function of the values of the neighboring pixels identified.

10. Method for decoding a current block of pixels of an image, comprising:
  entropy decoding a coded residual block to obtain a decoded residual block,
  inverse quantizing and inverse transforming the decoded residual block,
  determining a prediction block of the current block,
  determining the current block from said decoded residual block and said prediction block,
  wherein the prediction block of the current block is determined by: detecting, in a plurality of spatial prediction modes, redundant spatial prediction modes generating similar prediction blocks, generating, for each pair of redundant spatial prediction modes, an additional spatial prediction mode distinct from the spatial prediction modes of said plurality of spatial prediction modes and replacing, in said plurality of spatial prediction modes, one of the redundant spatial prediction modes by the additional spatial prediction mode, determining the prediction block of the current block according a spatial prediction mode of the plurality of spatial prediction modes.

11. Method according to claim 10, wherein detecting, in a plurality of spatial prediction modes, redundant spatial prediction modes comprises:
  determination of a prediction block for each spatial prediction mode,
  comparison, two by two, of the prediction blocks determined in such a manner as to determine, for each pair of prediction blocks, a value representative of the difference between both prediction blocks of the pair, and
  if, for a pair of prediction blocks, the value is less than a first threshold, then the two spatial prediction modes corresponding to the two prediction blocks of the pair are considered as redundant.

12. Method according to claim 10, wherein detecting, in a plurality of spatial prediction modes, redundant spatial prediction modes is carried out from values, in luminance and/or in chrominance, of neighboring pixels on which said spatial prediction modes are based.

13. Method according to claim 12, wherein detecting, in a plurality of spatial prediction modes, redundant spatial prediction modes comprises:
  calculation of the average value, called first average value, of the luminance or chrominance values of the neighboring pixels on which a first spatial prediction mode is based,
  calculation of the average value, called second average value, of the luminance or chrominance values of the neighboring pixels on which a second spatial prediction mode is based,
  calculation of the absolute value of the difference between the first average value and the second average value,
  if the absolute value of the difference is less than a second threshold, then said first and second spatial prediction modes are redundant spatial prediction modes.

14. Method according to claim 13, wherein, prior to the calculation of the first or second average value, detecting redundant spatial prediction modes comprises
  calculation of the maximum difference of the luminance or chrominance values of the neighboring pixels on which the first or second spatial prediction mode is based, if said maximum difference is greater than or equal to a third threshold, then said first or second spatial prediction mode is removed from the redundant spatial prediction modes.

15. Method according to claim 10, wherein the additional spatial prediction mode replacing a given spatial prediction mode is obtained by:
   enlarging by 1 pixel, in a direction opposite the prediction direction of the spatial prediction mode to replace, the zone of the neighboring pixels on which said spatial prediction mode to replace is based, in such a manner as to obtain a set of neighboring pixels on which the additional spatial prediction mode is based,
   checking if said additional spatial prediction mode and said spatial prediction mode are not redundant,
   if said additional spatial prediction mode and said spatial prediction mode are redundant, starting the enlargement again until said additional spatial prediction mode and said prediction mode are not redundant.

16. Method according to claim 15, wherein the enlargement is only reiterated at most a predetermined number of times.

17. Method according to claim 15, wherein calculation of the value of a pixel p of the prediction block according to an additional spatial prediction mode comprises:
   among the pixels of the set of neighboring pixels of the additional spatial prediction mode, identifying of the neighboring pixels present along a vector pointing to the pixel p and parallel to the direction of prediction of the additional spatial prediction mode, and
   calculating the value of the pixel p of the prediction block from the value of the neighboring pixels identified.

18. Method according to claim 17, wherein the value of the pixel p is calculated by an interpolation function of the values of the neighboring pixels identified.

19. Encoder comprising at least a processor configured to:
   determine a prediction block of a current block,
   determine a residual block from said current block and said prediction
   transform and quantize the residual block according to a quantization step size to obtain a quantized residual block, and
   entropy encode the quantized residual block, wherein the prediction block of the current block is determined by:
   detecting, in a plurality of spatial prediction modes, redundant spatial prediction modes generating similar prediction blocks,
   generating, for each pair of redundant spatial prediction modes, an additional spatial prediction mode distinct from the spatial prediction modes of said plurality of spatial prediction modes and replacing, in said plurality of spatial prediction modes, one of the redundant spatial prediction modes by the additional spatial prediction mode,
   determining the prediction block of the current block according a spatial prediction mode of the plurality of spatial prediction modes.

20. Encoder according to claim 19, wherein detecting, in a plurality of spatial prediction modes, redundant spatial prediction modes comprises:
   determination of a prediction block for each spatial prediction mode,
   comparison, two by two, of the prediction blocks determined in such a manner as to determine, for each pair of prediction blocks, a value representative of the difference between both prediction blocks of the pair, and
   if, for a pair of prediction blocks, the value is less than a first threshold, then the two spatial prediction modes corresponding to the two prediction blocks of the pair are considered as redundant.

21. Encoder according to claim 19, wherein detecting, in a plurality of spatial prediction modes, redundant spatial prediction modes is carried out from values, in luminance and/or in chrominance, of neighboring pixels on which said spatial prediction modes are based.

22. Encoder according to claim 21, wherein detecting, in a plurality of spatial prediction modes, redundant spatial prediction modes comprises:
   calculation of the average value, called first average value, of the luminance or chrominance values of the neighboring pixels on which a first spatial prediction mode is based,
   calculation of the average value, called second average value, of the luminance or chrominance values of the neighboring pixels on which a second spatial prediction mode is based,
   calculation of the absolute value of the difference between the first average value and the second average value,
   if the absolute value of the difference is less than a second threshold, then said first and second spatial prediction modes are redundant spatial prediction modes.

23. Encoder according to claim 22, wherein, prior to the calculation of the first or second average value, detecting redundant spatial prediction modes comprises
   calculation of the maximum difference of the luminance or chrominance values of the neighboring pixels on which the first or second spatial prediction mode is based,
   if said maximum difference is greater than or equal to a third threshold, then said first or second spatial prediction mode is removed from the redundant spatial prediction modes.

24. Encoder according to claim 19, wherein the additional spatial prediction mode replacing a given spatial prediction mode is obtained by:
   enlarging by 1 pixel, in a direction opposite the prediction direction of the spatial prediction mode to replace, the zone of the neighboring pixels on which said spatial prediction mode to replace is based, in such a manner as to obtain a set of neighboring pixels on which the additional spatial prediction mode is based,
   checking if said additional spatial prediction mode and said spatial prediction mode are not redundant,
   if said additional spatial prediction mode and said spatial prediction mode are redundant, starting the enlargement again until said additional spatial prediction mode and said prediction mode are not redundant.

25. Encoder according to claim 24, wherein the enlargement is only reiterated at most a predetermined number of times.

26. Encoder according to claim 24, wherein calculation of the value of a pixel p of the prediction block according to an additional spatial prediction mode comprises:
   among the pixels of the set of neighboring pixels of the additional spatial prediction mode, identifying of the neighboring pixels present along a vector pointing to the pixel p and parallel to the direction of prediction of the additional spatial prediction mode, and
   calculating the value of the pixel p of the prediction block from the value of the neighboring pixels identified.

27. Encoder according to claim 26, wherein the value of the pixel p is calculated by an interpolation function of the values of the neighboring pixels identified.

28. Decoder comprising at least a processor configured to:
entropy decode a coded residual block to obtain a decoded residual block,
inverse quantize and inverse transform the decoded residual block,
determine a prediction block of a current block,
determining the current block from said decoded residual block and said prediction block,
wherein the prediction block of the current block is determined by: detecting, in a plurality of spatial prediction modes, redundant spatial prediction modes generating similar prediction blocks, generating, for each pair of redundant spatial prediction modes, an additional spatial prediction mode distinct from the spatial prediction modes of said plurality of spatial prediction modes and replacing, in said plurality of spatial prediction modes, one of the redundant spatial prediction modes by the additional spatial prediction mode, determining the prediction block of the current block according a spatial prediction mode of the plurality of spatial prediction modes.

29. Decoder according to claim 28, wherein detecting, in a plurality of spatial prediction modes, redundant spatial prediction modes comprises:
determination of a prediction block for each spatial prediction mode,
comparison, two by two, of the prediction blocks determined in such a manner as to determine, for each pair of prediction blocks, a value representative of the difference between both prediction blocks of the pair, and
if, for a pair of prediction blocks, the value is less than a first threshold, then the two spatial prediction modes corresponding to the two prediction blocks of the pair are considered as redundant.

30. Decoder according to claim 28, wherein detecting, in a plurality of spatial prediction modes, redundant spatial prediction modes is carried out from values, in luminance and/or in chrominance, of neighboring pixels on which said spatial prediction modes are based.

31. Decoder according to claim 30, wherein detecting, in a plurality of spatial prediction modes, redundant spatial prediction modes comprises:
calculation of the average value, called first average value, of the luminance or chrominance values of the neighboring pixels on which a first spatial prediction mode is based,
calculation of the average value, called second average value, of the luminance or chrominance values of the neighboring pixels on which a second spatial prediction mode is based,
calculation of the absolute value of the difference between the first average value and the second average value,
if the absolute value of the difference is less than a second threshold, then said first and second spatial prediction modes are redundant spatial prediction modes.

32. Decoder according to claim 31, wherein, prior to the calculation of the first or second average value, detecting redundant spatial prediction modes comprises
calculation of the maximum difference of the luminance or chrominance values of the neighboring pixels on which the first or second spatial prediction mode is based,
if said maximum difference is greater than or equal to a third threshold, then said first or second spatial prediction mode is removed from the redundant spatial prediction modes.

33. Decoder according to claim 28, wherein the additional spatial prediction mode replacing a given spatial prediction mode is obtained by:
enlarging by 1 pixel, in a direction opposite the prediction direction of the spatial prediction mode to replace, the zone of the neighboring pixels on which said spatial prediction mode to replace is based, in such a manner as to obtain a set of neighboring pixels on which the additional spatial prediction mode is based,
checking if said additional spatial prediction mode and said spatial prediction mode are not redundant,
if said additional spatial prediction mode and said spatial prediction mode are redundant, starting the enlargement again until said additional spatial prediction mode and said prediction mode are not redundant.

34. Decoder according to claim 33, wherein the enlargement is only reiterated at most a predetermined number of times.

35. Decoder according to claim 33, wherein calculation of the value of a pixel p of the prediction block according to an additional spatial prediction mode comprises:
among the pixels of the set of neighboring pixels of the additional spatial prediction mode, identifying of the neighboring pixels present along a vector pointing to the pixel p and parallel to the direction of prediction of the additional spatial prediction mode, and
calculating the value of the pixel p of the prediction block from the value of the neighboring pixels identified.

36. Decoder according to claim 35, wherein the value of the pixel p is calculated by an interpolation function of the values of the neighboring pixels identified.

* * * * *